3,444,167
PROCESS FOR THE PRODUCTION OF
THIAMINE DERIVATIVES
Masuo Murakami, Kozo Takahashi, Kiyoshi Murase, Hidenori Iwamoto, and Yasubumi Hirata, Tokyo, Japan, assignors to Yamanouchi Pharmaceutical Co., Ltd., Chuo-ku, Tokyo, Japan
No Drawing. Filed Feb. 10, 1966, Ser. No. 526,408
Claims priority, application Japan, Feb. 16, 1965, 40/8,758
Int. Cl. C07d 51/42, 89/12
U.S. Cl. 260—256.5
12 Claims

ABSTRACT OF THE DISCLOSURE

Compounds of the formula

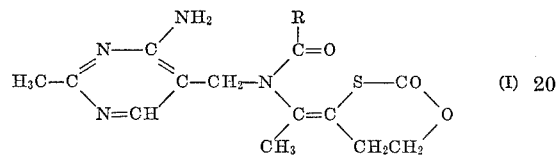

wherein R is H or α-hydroxyethyl, having a rapid and prolonged vitamin $B_1$ activity, can be prepared by reacting a compound of the formula

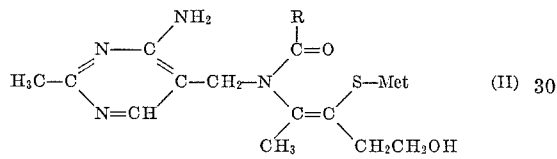

with an active carbonyl compound such as phenylchlorocarbonate. A novel S-carbonyl thiamine derivative such as the compound of the formula

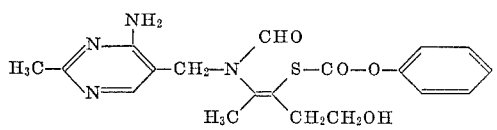

can be isolated as intermediate, if desired. The end products are used in vitamin $B_1$ therapy.

---

The present invention relates to a novel process for the prepartion of thiol-type thiamine derivatives, particularly those thiol-type thiamine derivatives which have the cyclic thiol carbonate structure in which the sulfur atom of the thiol group is bound to the oxygen atom of the β-hydroxyethyl group through a carbonyl group, and their salts with an inorganic or organic acid.

It relates further to intermediate S-carbonyl thiamine derivatives obtained in the course of the novel process, a process for the preparation of the S-carbonyl thiamine derivatives, and a process for the preparation of the thiol-type thiamine derivatives of the cyclic thiol carbonate structure from said S-carbonyl thiamine derivatives.

The thiol-type thiamine derivatives of the present invention are represented by the general Formula I:

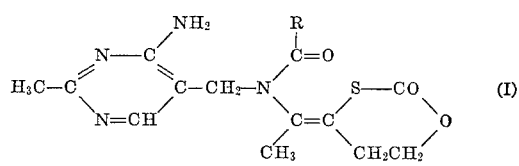

(wherein R is a hydrogen atom or an α-hydroxyethyl group and, when the R is an α-hydroxyethyl group, said formula means dl-form and optically active d-form and l-form).

The compound of the present invention of the Formula I is hereinafter termed "carbothiamine" when R represents a hydrogen atom, and "carbohydroxyethyl thiamine" when R represents an α-hydroxyethyl group.

The physico-chemical characteristics and the physiological properties of the carbothiamine and the carbohydroxyethyl thiamine are already described in the prior application Ser. No. 480,118 filed on Aug. 16, 1965, now U.S. Patent No. 3,324,124, together with a process for their preparation.

According to the present invention, the aforementioned compounds of the Formula I can also be prepared by reacting a thiol-type thiamine derivative of the Formula II:

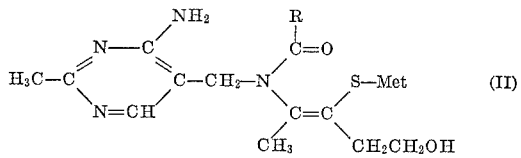

(wherein R has the same significance as defined above and Met is a hydrogen atom, an alkali metal, ammonium radical or other basic radical) with an active carbonyl compound of the Formula III:

(wherein X is a halogen atom, phenoxy, a substituted phenoxy, phenylthio or a substituted phenylthio, and Y is phenoxy, a substituted phenoxy, phenylthio or a substituted phenylthio). As the active carbonyl compound of the Formula III various compounds may be used. Among them are preferred p-nitrophenyl chlorocarbonate, phenyl chlorocarbonate, di-p-nitrophenyl carbonate, phenylthio chlorocarbonate, o-nitrophenyl chlorocarbonate, p-chlorophenyl chlorocarbonate, o-carbomethoxyphenyl chlorocarbonate, β-napthyl chlorocarbonate, and so forth.

According to the process of this invention, the objective reaction product is more readily separated from the by-products simultaneously formed and unreacted starting material, which may contaminate the reaction product, as compared with the process of the aforementioned prior application wherein carbonyl dihalide and the compound used as solvent are apt to cause undesired reactions which result in increase of the by-products and consumption of the reagent. Therefore the process of the present invention is suitable for commercial production.

Therefore, an object of the present invention is to provide an improved process for the preparation of the carbothiamine or carbohydroxyethyl thiamine derivatives of Formula I from the thiol-type thiamine or thiol-type hydroxyethyl thiamine derivatives of Formula II.

The starting compounds of the process of this invention, namely the thiol-type thiamine or thiol-type hydroxyethyl thiamine derivatives of the Formula II, may be prepared in per se conventional manner by reacting a mineral acid salt of thiazolium-type thiamine or thiazolium-type hydroxyethyl thiamine with an alkaline substance such as an alkali metal, an alkali metal hydroxide, an alkali carbonate, an alkali metal alkoxide and ammonium hydroxide.

The active carbonyl compounds of Formula III employed in the present invention may be prepared in accordance with, for example, the method described in J. Amer. Chem. Soc., 56, 1586 (1934).

The reaction of the present process may be carried out in a suitable solvent. Although a variety of solvents may be empolyod, water, a lower alcohol, chloroform, tetrahydrofuran, dioxane, acetone, or a mixture thereof is preferred. Above all, a mixture of water and ethanol gives good results. To the starting compound of the Formula II in said solvent, the active carbonyl compound of the Formula III is added in an amount stoichiometrically equivalent or more, usually as a solution in an inert solvent such as ethyl acetate.

The reaction of the present invention may be carried out usually at room temperature (about 20 to 30° C.) or under warming on a water bath, though the optimum reaction temperature depends on the active carbonyl compound used and the solvent employed. The reaction under such reaction temperature is continued for up to two hours. In many cases, however, a reaction time of about one hour would be sufficient.

It has been found that when the above reaction is conducted at a low temperature, s-carbonyl thiamine derivative of the Formula IV:

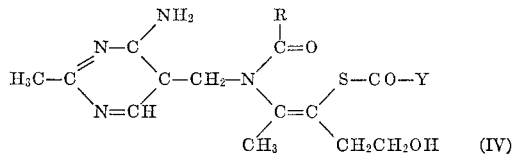

(wherein R and Y have the same significances as defined above) are predominantly produced. These S-carbonyl thiamine derivatives of Formula IV, namely S-aryloxy- or S-arylthio-carbonyl thiamines and S-aryloxy- or S-arylthio-carbonylhydroxyethyl thiamines, are produced when the reaction is carried out at temperatures between −10° C. and 0° C. The isolation of the S-carbonyl thiamine derivatives of Formula IV from the reaction mixture can be effected by extraction with organic solvents, advantageously after removal of water-miscible solvents if any.

Further, it has been found that the compounds of Formula IV are converted into the afore-mentioned cyclic compounds of Formula I—the objective compounds of this invention—when they are subjected to a mild heat-treatment or a treatment with an alkaline substance such as an alkali hydroxide, an alkali carbonate or ammonium hydroxide. The alkaline substance is used preferably in an amount about stoichiometrically equivalent to that of the S-carbonyl thiamine derivative.

Accordingly, another object of the present invention is to provide S-carbonyl thiamine derivatives of Formula IV and a process for the preparation of the same.

Also, a further object of the present invention is to provide a process for the preparation of the carbothiamine or carbohydroxyethyl thiamine derivatives of Formula I from S-carbonyl thiamine derivatives of Formuma IV.

The carbothiamine or carbohydroxyethyl thiamine thus prepared of Formula I can be easily recovered from the reaction mixture by a pe se conventional method. For instance, the reaction mixture is acidified and extracted with organic solvents to remove the by-products and the remaining reagent, and thereafter the aqueous layer is neutralized. The product is separated from the neutralized aqueous layer by filtration or by extraction with organic solvents. The product may be refined further by recrystallization from solvents such as water, a lower alcohol or ethylene dichloride. It may otherwise be crystallized and refined as acid salts by treating it with a mineral acid such as hydrochloric acid or with an innoxious organic acid, such as citric acid, tartaric acid, etc.

Each of the afore-mentioned Formulas I, II and IV represents derivatives of thiamine when R represents a hydrogen atom, and represents derivatives of hydroxyethyl thiamine when R represents an α-hydroxyethyl group, and in the latter case optically active product is obtained without occurrence of racemization if optically active compound is used as the starting material.

The thiamine derivatives produced according to the present invention are characterized (cf. also the afore-mentioned copending application) by vitamin $B_1$ activity coupled with low toxicity and rapid absorbability from the intestinal canal, a high vitamin $B_1$ level in the blood being maintained for a long time after oral administration.

The following examples of presently preferred embodiment are given by way of illustration only and are not intended to restrict the scope of the present invention, since various changes and modifications within the scope of the invention will become apparent to those skilled in the art from these examples.

EXAMPLE 1

To a mixture of 15.0 ml. (milliliters) of 2 N aqueous sodium hydroxide solution and 15.0 ml. of ethanol was added 3.4 g. (grams) of thiamine chloride hydrochloride, and the mixture was allowed to stand for 30 minutes at room temperature. Then, 2.0 g. of p-nitrophenyl chlorocarbonate in 10 ml. of ethyl acetate was added to the mixture while stirring, and the resulting mixture was stirred for one hour. The reaction mixture was made acid with hydrochloric acid, and ethanol was distilled off under reduced pressure. After the extraction with ethyl acetate, the remaining aqueous layer was neutralized with sodium bicarbonate and extracted with ethyl acetate. After drying over anhydrous magnesium sulfate, the latter ethyl acetate extract was concentrated and the crystals formed were recovered by filtration, and then were washed with a small amount of ethyl acetate to give 1.3 g. of the carbothiamine; M.P. 176–178° C. (decomp.). The product thus obtained was identical with the authentic sample prepared by another route using phosgene. The product showed the same infrared spectrum as the authentic sample, and no depression of the melting point was observed when it was mixed with the authentic sample.

EXAMPLE 2

Into 20 ml. of ethanol was dissolved 3.0 g. of sodium salt of thiol-type thiamine, and to the resulting solution was added 2.0 g. of p-nitrophenyl chlorocarbonate in 10 ml. of ethyl acetate with stirring. The mixture was stirred for one hour at room temperature and was then made acid with hydrochloric acid. The solvent was distilled off under reduced pressure and the residue was dissolved in water. After the extraction with ethyl acetate, the remaining aqueous layer was treated in the same manner as in Example 1 whereby 1.1 g. of the carbothiamine was obtained.

EXAMPLE 3

In 20 ml. of chloroform was suspended 3.0 g. of sodium salt of thiol-type thiamine, and to the suspension was added with stirring 2.0 g. of p-nitrophenyl chlorocarbonate in 10 ml. of chloroform. The mixture was stirred for one hour at room temperature and then extracted with 1 N hydrochloric acid solution. The aqueous layer was treated in the same manner as in Example 1 whereby 1.5 g. of the carbothiamine was obtained.

EXAMPLE 4

The procedure of Example 1 was followed except that 1.55 g. of phenyl chlorocarbonate was used instead of 2.0 g. of p-nitrophenyl chlorocarbonate in 10 ml. of ethyl acetate, whereby 0.9 g. of the carbothiamine was obtained.

EXAMPLE 5

To a mixture of 15.0 ml. of 2 N aqueous sodium hydroxide solution and 15.0 ml. of ethanol was added 3.4 g. of thiamine chloride hydrochloride, and the mixture was allowed to stand for 30 minutes at room temperature and then cooled to −10° C. After the addition of 1.6 g. of phenyl chlorocarbonate with stirring, the mixture was stirred for further 10 minutes. The reaction mixture was then extracted with chloroform. After washing with water and drying over anhydrous magnesium sulfate, the extract was concentrated under reduced pressure and the crystals obtained were recovered by filtration, the crystals being then washed with a small amount of ethyl acetate to give 2.6 g. of S-carbophenoxy thiamine; M.P. 118–120° C. (decomp.). When recrystallized from chloroform-petr. ether, the product showed the M.P. of 119–121° C. (decomp.).

*Analysis.*—Calcd. for $C_{19}H_{22}N_4O_4S$: C, 56.70; H, 5.51; N, 13.92. Found: C, 56.81; H, 5.59; N, 13.88.

In 30 ml. of chloroform was dissolved 1.4 g. of thus-obtained S-carbophenoxy thiamine, and the mixture was warmed at a temperature of 50–60° C. for one and a half hours on a water bath. The reaction mixture was extracted with dilute hydrochloric acid and, after neutralization with sodium bicarbonate, the aqueous layer was extracted with ethyl acetate. The ethyl acetate extract was dried and concentrated. From the crystalline residue thus obtained, the crystals were recovered by filtration and washed with a small amount of ethyl acetate to give 0.7 g. of the carbothiamine; M.P. 176–177° C. (decomp.).

EXAMPLE 6

In 20 ml. of methanol was suspended 4.0 g. of S-carbophenoxy thiamine, and to the suspension was added under ice-cooling 10 ml. of 1 N aqueous sodium hydroxide solution. The mixture was made acid by adding dilute hydrochloric acid and then extracted with ethyl acetate. After neutralization with sodium bicarbonate, the aqueous layer was extracted with theyl acetate. The second ethyl acetate extract was dried over anhydrous magnesium sulfate and concentrated under reduced pressure. From the crystalline residue thus obtained, the crystals were recovered by filtration and washed with a small amount of ethyl acetate to give 0.9 g. of the carbothiamine; M.P. 176–178° C. (decomp.).

EXAMPLE 7

The procedure of Example 1 was followed except that 3.0 g. of di-p-nitrophenyl carbonate was used instead of 2.0 g. of p-nitrophenyl chlorocarbonate and that the reaction was carried out at a temperature of 40–50° C. on a water bath, whereby 1.5 g. of the carbothiamine was obtained.

EXAMPLE 8

The procedure of Example 1 was followed except that 2.0 g. of phenylthio chlorocarbonate was used instead of 2.0 g. of p-nitrophenyl chlorocarbonate in 10 ml. of ethyl acetate and that the reaction was carried out at a temperature of 30–40° C. on a water bath, whereby 1.0 g. of carbothiamine was obtained.

EXAMPLE 9

To a mixture of 15.0 ml. of 2 N aqueous sodium hydroxide solution and 15.0 ml. of ethanol was added 3.4 g. of thiamine chloride hydrochloride, and the mixture was allowed to stand for 30 minutes at room temperature and then cooled to 0° C. After the addition of 2.0 g. of phenylthio chlorocarbonate with stirring, the mixture was stirred for further 10 minutes. The reaction mixture was made acid with hydrochloric acid, and ethanol was distilled off under reduced pressure. The reaction mixture was neutralized with sodium bicarbonate and extracted with chloroform. After drying over anhydrous magnesium sulfate, the chloroform extract was concentrated and the crystals obtained were washed with ethyl acetate to give 3.8 g. of S-carbophenylthio thiamine. When recrystallized from chloroform-petr. ether, the product showed the M.P. 118–119° C. (decomp.).

*Analysis.*—Calcd. for $C_{19}H_{22}N_4O_3S_2$: C, 54.52; H, 5.30; S, 15.32. Found: C, 54.36; H, 5.11; S, 15.25.

In 20 ml. of chloroform was dissolved 2 g. of the S-carbothiophenyl thiamine, and the solution was refluxed for one and a half hours on a water bath. The chloroform solution was extracted with dilute hydrochloric acid and, after neutralization with sodium bicarbonate, the aqueous layer was extracted with ethyl acetate. The ethyl acetate extract was dried over anhydrous magnesium sulfate and concentrated. From the crystalline residue obtained, the crystals were recovered by filtration and washed with ethyl acetate and then acetone to give 0.4 g. of the carbothiamine; M.P. 175–177° C. (decomp.).

EXAMPLE 10

The procedure of Example 1 was followed except that an equivalent amount of hydroxyethyl thiamine chloride hydrochloride was used instead of thiamine chloride hydrochloride, whereby 1.9 g. of white crystals of carbohydroxyethyl thiamine; M.P. 195–196° C. (decomp.), were obtained. When recrystallized from aqueous ethanol, the product showed the M.P. of 196–197° C. (decomp.). It was identical with the authentic sample prepared by another route using phosgene. The product showed the same infrared spectrum as the authentic sample, and no depression of the melting point was observed when it was mixed with the authentic sample.

EXAMPLE 11

The procedure of Example 3 was followed except that 3.4 g. of sodium salt of thiol-type hydroxyethyl thiamine was used instead of 3.0 g. of sodium salt of thiol-type thiamine, whereby 2.0 g. of the carbohydroxyethyl thiamine was obtained.

EXAMPLE 12

The procedure of Example 1 was followed except that an equivalent amount of hydroxyethyl thiamine chloride hydrochloride was used instead of thiamine chloride hydrochloride, that 3.0 g. of di-p-nitrophenyl carbonate was used in place of 2.0 of p-nitrophenyl chlorocarbonate, and that the reaction was carried out at a temperature of 40–50° C. on a water bath, whereby 1.8 g. of the carbohydroxyethyl thiamine was obtained.

EXAMPLE 13

The procedure of Example 1 was followed except that an equivalent amount of hydroxyethyl thiamine chloride hydrochloride was used in place of thiamine chloride hydrochloride, that 2.0 g. of phenylthio chlorocarbonate was used instead of 2.0 g. of p-nitrophenyl chlorocarbonate in 10 ml. of ethyl acetate, and that the reaction was carried out at a temperature of 30–40° C. on a water bath, whereby 1.5 g. of the carbohydroxyethyl thiamine was obtained.

EXAMPLE 14

The procedure of Example 1 was followed except that an equivalent amount of d-hydroxyethyl thiamine chloride hydrochloride ($[\alpha]_D^{23} = +11.7°$ (c.=2.0,$H_2O$)) was used in place of thiamine chloride hydrochloride, whereby 1.85 g. of an optically active carbohydroxyethyl thiamine was obtained; M.P. 195° C. (decomp.). It was identical with the authentic sample prepared by another route using phosgene. The product showed the same infrared spectrum as the authentic sample, and no depression of the melting point was observed when it was mixed with the authentic sample. The product showed the specific rotation $[\alpha]_D^{23} = -28.7°$ (c.=1.2, 0.1 N HCl).

EXAMPLE 15

To 100 ml. of 3 N aqueous sodium hydroxide solution was added 33.7 g. of thiamine chloride hydrochloride, and the mixture was allowed to stand for 30 minutes at room temperature tnd then cooled to −10° C. After the slow addition of 20 g. of o-nitrophenyl chlorocarbonate with stirring, the mixture was stirred for further 30 minutes. To the reaction mixture thus obtained was added 300 ml. of chloroform, and the whole was heated on a water bath at 60–65° C. for one hour with stirring. After cooling, the reaction mixture was extracted with 100 ml. of dilute hydrochloric acid and the aqueous extract was washed with chloroform. The aqueous extract separated was neutralized with sodium bicarbonate and then cooled. The crystals precipitated were recovered by filtration and washed with water to give 21.2 g. of the carbothiamine. By extraction of the mother liquor with chloroform, further 1.5 g. of the carbothiamine was obtained.

What is claimed is:

1. A process for the preparation of a thiol-type thiamine derivative of the formula

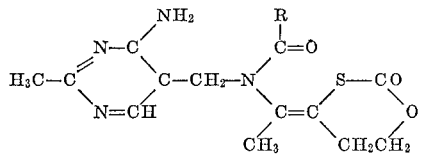

wherein R is selected from the group consisting of a hydrogen atom and

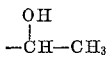

which comprises reacting at room temperature a thiol-type thiamine derivative of the formula:

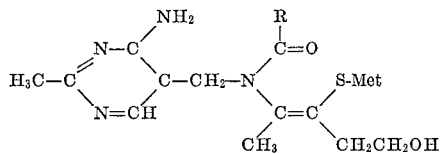

wherein R has the same significance as defined above and Met is an alkali metal atom, with an active carbonyl compound of the formula $$X-CO-Y$$

wherein X is selected from the group consisting of a halogen atom, phenoxy and nitro-substituted phenoxy, and Y is selected from the group consisting of phenoxy, phenoxy substituted with nitro, phenoxy substituted with carbomethoxy, phenoxy substituted with 1,3-butadienylene, and phenylthio.

2. A process as claimed in claim 1 wherein the active carbonyl compound is p-nitrophenyl chlorocarbonate.

3. A process as claimed in claim 1 wherein the active carbonyl compound is phenyl chlorocarbonate.

4. A process as claimed in claim 1 wherein the active carbonyl compound is di-p-nitrophenyl carbonate.

5. A process as claimed in claim 1 wherein the active carbonyl compound is phenylthio chlorocarbonate.

6. An S-carbonyl thiamine derivative of the formula

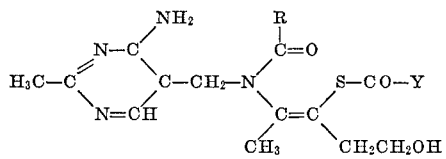

wherein R is selected from the group consisting of a hydrogen atom and

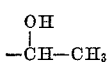

and Y is selected from the group consisting of phenoxy, phenoxy substituted with nitro, phenoxy substituted with carbomethoxy, phenoxy substituted with 1,3-butadienylene and phenylthio.

7. An S-carbonyl thiamine derivative according to claim 6, said derivative being S-carbophenoxy thiamine.

8. An S-carbonyl thiamine derivative according to claim 6, said derivative being S-carbophenylthio thiamine.

9. A process for the preparation of a thiol-type thiamine derivative of the formula

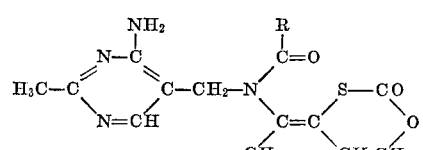

wherein R is selected from the group consisting of a hydrogen atom and

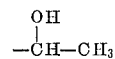

which comprises heating at a temperature of about 50° to about 60° C. an S-carbonyl thiamine derivative of the formula

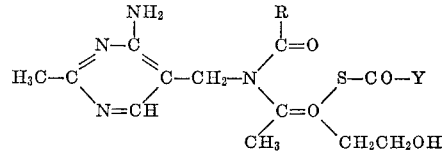

wherein R has the same significance as defined above and Y is selected from the group consisting of phenoxy, phenoxy substituted with nitro, phenoxy substituted with carbomethoxy, phenoxy substituted with 1,3-butadienylene and phenylthio.

10. A process for the preparation of thiol-type thiamine derivative of the formula

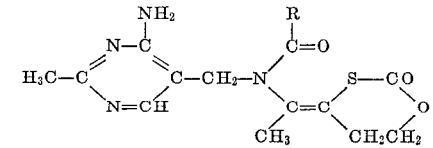

wherein R is selected from the group consisting of a hydrogen atom and

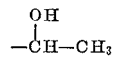

which comprises treating an S-carbonyl thiamine derivative of the formula

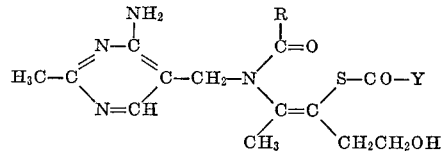

wherein R has the same significance as defined above and Y is selected from the group consisting of phenoxy, phenoxy substituted with nitro, phenoxy substituted with carbomethoxy, phenoxy substituted with 1,3-butadienylene and phenylthio, with an alkaline substance selected from the group consisting of an alkali hydroxide, an alkali carbonate and ammonium hydroxide.

11. A process as claimed in claim 10 wherein the S-carbonyl thiamine derivative is treated with about stoichiometrically equivalent amount of alkaline substance.

12. A process as claimed in claim 10 wherein 1 N aqueous sodium hydroxide solution is the alkaline substance.

References Cited

UNITED STATES PATENTS 3,324,124 6/1967 Murakami et al. ____ 260—256.5

FOREIGN PATENTS 944,641 12/1963 Great Britain.

ALEX MAZEL, Primary Examiner.

R. J. GALLAGHER, Assistant Examiner.

U.S. Cl. X.R.

260—999